US005168290A

United States Patent [19]

Tanaka et al.

[11] Patent Number: 5,168,290

[45] Date of Patent: Dec. 1, 1992

[54] IMAGE FORMING APPARATUS HAVING RECORDING MATERIAL CARRYING MEANS

[75] Inventors: Kiyoharu Tanaka, Yokohama; Kouji Kimura, Tokyo; Hajime Suzuki, Yokohama, all of Japan

[73] Assignee: Canon Kabushiki Kaisha, Tokyo, Japan

[21] Appl. No.: 604,171

[22] Filed: Oct. 29, 1990

[30] Foreign Application Priority Data

Feb. 6, 1990 [JP] Japan .................................. 2-27659

[51] Int. Cl.[5] .......................................... G01D 15/24

[52] U.S. Cl. .................................. 346/134; 346/157; 355/271; 355/308; 355/321; 355/309; 271/229; 271/275

[58] Field of Search ............... 355/308, 321, 309, 336, 355/271; 346/157, 134; 271/229, 242, 270, 275

[56] References Cited

U.S. PATENT DOCUMENTS

| | | | |
|---|---|---|---|
| 2,807,233 | 9/1957 | Fitch | 355/271 X |
| 2,909,971 | 10/1959 | Barber, Jr. | 355/271 |
| 3,832,053 | 8/1974 | Goel et al. | 355/271 |
| 3,863,913 | 2/1975 | Hirafuji | 271/270 X |
| 3,966,198 | 6/1976 | Komada et al. | 271/270 X |
| 3,966,199 | 6/1976 | Silverberg | 271/275 |
| 4,056,263 | 11/1977 | La White et al. | 271/275 X |
| 4,371,251 | 1/1983 | Morse | 355/271 |
| 4,464,042 | 8/1984 | Omori et al. | 355/309 |
| 4,534,551 | 8/1985 | Jones | 271/275 |
| 4,609,276 | 9/1986 | Mitzutani | 355/309 |
| 4,696,465 | 9/1987 | Willi | 271/270 X |
| 4,733,281 | 3/1988 | Yoshinaga et al. | 355/326 |
| 4,809,033 | 2/1989 | Ikemoto et al. | 355/271 |
| 4,851,927 | 7/1989 | Moriya | 358/300 |
| 5,019,871 | 5/1991 | Takeda et al. | 355/309 |
| 5,038,178 | 8/1991 | Hosoya et al. | 355/271 X |
| 5,084,736 | 1/1992 | Suzuki et al. | 355/271 |
| 5,086,318 | 2/1992 | Takeda et al. | 355/271 |
| 5,128,717 | 7/1992 | Uchikawa et al. | 355/271 X |

FOREIGN PATENT DOCUMENTS

| | | |
|---|---|---|
| 55-32079 | 3/1980 | Japan . |
| 60-14266 | 1/1985 | Japan . |
| 60-95468 | 5/1985 | Japan . |

*Primary Examiner*—Benjamin R. Fuller
*Assistant Examiner*—Randy W. Gibson
*Attorney, Agent, or Firm*—Fitzpatrick, Cella, Harper & Scinto

[57] ABSTRACT

An image forming apparatus includes recording material carrying device for carrying thereon a recording material; image forming device for forming an image on the recording material carried on the recording material carrying device; attracting chargęr for electrostatically attracting the recording material on the recording material carrying device, the attracting charger first attracting the recording material on the recording material carrying device; feeding rollers for feeding the recording material to the recording material carrying device to attract it to the recording material carrying device, wherein a feeding speed by the feeding rollers is the same as or larger than a movement speed of the recording material carrying device or larger.

21 Claims, 7 Drawing Sheets

IMAGE FORMING APPARATUS HAVING RECORDING MATERIAL CARRYING MEANS

FIELD OF THE INVENTION AND RELATED ART

The present invention relates to an image forming apparatus such as an electrophotographic apparatus or an electrostatic recording apparatus, more particularly to an image forming apparatus wherein an image such as a toner image formed on an image bearing member is transferred onto a recording material carried on a recording material carrying means such as a transfer drum.

In an image forming apparatus such as a color electrophotographic copying apparatus, a toner image is formed on an image bearing member such as a photosensitive drum, and is transferred onto a transfer material at the recording material. Usually, the transfer material is carried on a transfer drum made of a drum-like frame wrapped by a transfer material carrying sheet such as a high resistance film. The transfer material supplied to the transfer drum is fixed and retained on the periphery of the transfer drum by an electrostatic attraction force between the carrying sheet and the transfer material, as disclosed in Japanese Laid-Open Patent Application No. 32079/1980. By rotating the transfer drum a plurality of times, the same transfer material is presented to the transfer position a plurality of times to receive plural color toner images by electrostatic ports superposedly.

On the other hand, the transfer material is supplied from the sheet supply position, prior to the start of the image transfer operation, and is fed to the attracting position on the transfer material carrying sheet at a predetermined timing by a couple of conveying rollers. At the attracting position, a corona charger is disposed at the backside of the transfer material carrying sheet. On the transfer material carrying sheet, there is disposed a conductive roller (charge injection roller) rolling on the transfer material to be attracted and retained on the carrying sheet, by which electric charge having the polarity opposite to the toner image is applied to the transfer material is attracted on the carrying sheet. Here, the conductive roller follows the transfer drum rotation and is contacted to the transfer drum, so that the transfer material is conveyed at the same speed as the moving speed of the transfer material carrying sheet.

However, when, for example, the feeding speed of the conveying rollers is smaller than the conveying speeds of the transfer drum, the conveying rollers pulls the trailing side of the transfer material. Particularly in an apparatus wherein the transfer material is sequentially attracted on the carrying sheet of the transfer drum electrostatically without a gripper for gripping the transfer material, as disclosed in Japanese Laid-Open Patent Application No. 32079/1980, the position of the transfer material on the carrying sheet is deviated. Because the carrying sheet is usually made of PVD (polyfluorinated vinylidene) having a thickness of several tens—several hundreds microns or PET (polyethylene terephthalate) resin having the similar thickness, the sheet is thin and flexible, the carrying sheet is deformed with the result of improper image transfer or misregistration between the first color toner image and the subsequent color images.

At the instance the trailing edge of the transfer material passes through the two conveying rollers, the carrying sheet having been deformed to be retracted backwardly restores (rebound) suddenly. The impact provided thereby is effective to produce the non-uniform image transfer.

This is a significant problem in the field of copying machines where the high quality of the image is desired, further particularly in the case of the color copying machine field where the faithful color reproduction is desired to be improved.

By the occurrence of the positional deviation of the transfer material on the carrying sheet, the improper attraction of the transfer material on the carrying sheet, attraction jam and the jam in the separating step at which the transfer material is separated from the carrying sheet, the sheet can be jammed.

SUMMARY OF THE INVENTION

Accordingly, it is a principal object of the present invention to provide an image forming apparatus wherein the recording material is correctly positioned on the recording material carrying means.

It is another object of the present invention to provide an image forming apparatus wherein the image deviation on the recording material is prevented to assure the high quality image.

It is a further object of the present invention to provide an image forming apparatus wherein the improper attraction of the recording material on the recording material carrying means and the jam of the recording material are prevented.

It is a yet further object of the present invention to provide an image forming apparatus wherein when the recording material carrying means is deformable such as a sheet of resin, the deformation is suppressed.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
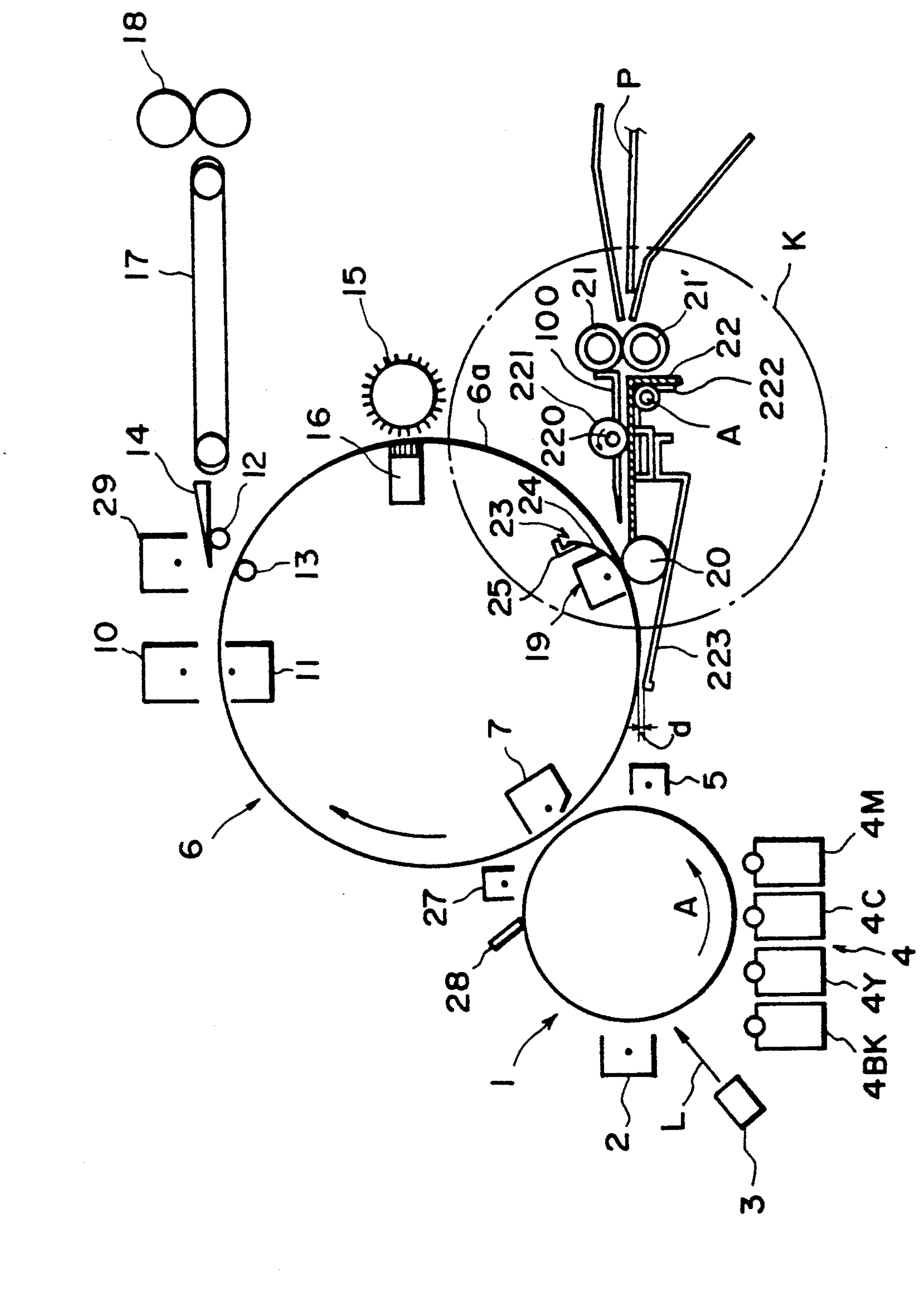
FIG. 1A is a sectional view of an image forming apparatus according to an embodiment of the present invention, wherein the conductive roller for the transfer material carrying sheet is at a contact position.

Referring to FIG. 1A, the image forming apparatus comprises a photosensitive drum 1 as the image bearing member and is rotatable in a direction indicated by an arrow A. Around the outer periphery of the photosensitive drum 1, there are disposed a primary charger 2, an optical system 3, a developing device 4 and a pre-transfer charger 5, in the order named with respect to the rotational direction of the photosensitive drum. The primary charger 2 uniformly charges the photosensitive drum 1, and the optical system 3 applies onto the surface of the photosensitive drum 1 a color separated light image or a light beam L corresponding thereto, at a predetermined timing, so that an electrostatic latent image is formed. As for the optical system, a laser beam scanning device or the like is used. The developing apparatus 4 is in the form of a horizontally movable type in which it is moved in a direction perpendicular to the surface of the photosensitive drum. It comprises four developing devices 4M, 4C, 4Y and 4BK which contain a magenta developer, a cyan developer, a yellow developer and a black developer, respectively. The developing apparatus 4 prevents the developing device selected corresponding to the selected color light image or the beam L corresponding thereto by the optical system, to the photosensitive drum 1 to form a toner image on the surface of the photosensitive drum 1.

The surface of the drum 1 on which the toner image has been formed is electrically charged to the polarity which is the same as that of the toner image by the pre-transfer charger 5.

Figure 2:
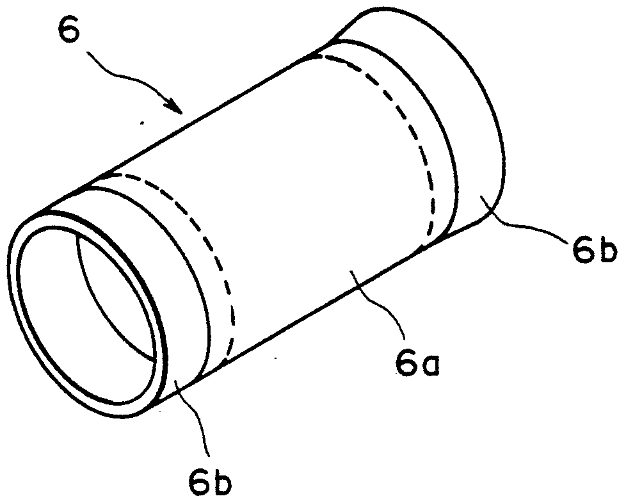
FIG. 2 is a perspective view of an image transfer device usable with an image forming apparatus according to an embodiment of the present invention.

Downstream of the pre-transfer charger 5 with respect to the movement direction of the periphery of the drum 1, an image transfer device 6 is disposed faced to the photosensitive drum 1. The transfer device 6, as shown in FIG. 2, is provided with a transfer drum having a transfer material carrying member, that is, a transfer material carrying sheet 6*a* in the form of a cylinder wrapped between opposite end frames 6*b* in a form of a cylinder. The transfer material carrying member carries thereon the transfer material. The transfer drum is movable along an endless path. Usually, the carrying sheet is a dielectric material film, such as PVDS or PET having a thickness of 100–200 microns. The material is flexible. As shown in FIG. 2, the transfer drum is not provided with a gripper for mechanically gripping the transfer material. As shown in FIG. 1A, at the image forming or the transfer station where the transfer sheet is contacted or faced to the photosensitive drum 1, there is disposed an image transfer corona charger 7 at the opposite side of the transfer material carrying sheet 6*a* from the transfer material carrying surface thereof, that is, inside the transfer drum 6. In this manner, an image is formed on the transfer material by the image forming means including the photosensitive drum, process means for forming the toner image on the photosensitive drum (charger, optical system, developing device or the like) and corona charger for transferring the toner image from the photosensitive drum to the transfer material.

The transfer drum 6 is rotationally driven in the direction indicated by an arrow. Upstream of the transfer station where the corona charger 7 is disposed, an attraction corona charger 19 is disposed at an opposite side of the transfer material carrying sheet 6*a* of the transfer material carrying surface thereof, that is, in the transfer drum 6, and a conductive roller (charge injection roller or charge injection means) 20 grounded is also disposed there in contact with the transfer material carrying surface. In this manner, by electrostatically attracting the transfer material to the carrying sheet at the initial stage of the attracting action the necessity for the gripper to retain the transfer material on the transfer drum 6, is eliminated.

Downstream of the transfer station or position with respect to the peripheral movement direction of the transfer drum 6, discharging corona dischargers 10 and 11 are disposed at the respective sides of the transfer material carrying sheet 6*a* to separate the transfer material from the transfer drum. In addition, urging rollers 12 and 13 are also disposed at the respective sides of the transfer material carrying sheet 6*a* to separate the transfer material P from the transfer material carrying sheet 6A by urging and deforming the transfer material carrying sheet upon the separating action. Adjacent thereto, there are disposed separation pawls 14. Further downstream, there are a brushing roller 15 for cleaning the transfer material carrying surface of the transfer material carrying sheet 6*a*, and if desired, a corona discharger (not shown) or a brush type discharger 16 for removing adhesive force (remaining Coulomb force and van der Waals force).

Adjacent to the transfer drum 6, an image fixing device 18 comprising the couple of fixing rollers is disposed to mix and fix by heat the multi-color toner image on the transfer material which has been separated from the transfer material carrying sheet 6*a* by separation pawls 14 and has been conveyed by a conveyer 17.

Furthermore, around the photosensitive drum 1, as shown in FIG. 1A, there is a discharger 27 for removing electrostatic charge from the transfer drum 1 after the image transfer action, and is a cleaning blade 28 for removing the remaining toner therefrom. As desired, an AC corona discharger 29 is disposed adjacent the separation pawl 14 for the purpose of preventing the image disturbance attributable to separation discharge which might occur upon the transfer material P being separated from the transfer material carrying sheet 6*a*.

With this structure, the surface of the photosensitive drum 1 for example is uniformly charged by a primary charger 2 and is exposed through the optical system 3 to a color image obtained through a green filter for example, so that a latent image to be mainly developed with a magenta component of the color image is formed. In synchronism with travel of the latent image, the developing device 4 moves in a tangential direction of the photosensitive drum 1 to present the developing device 4M containing the magenta developer to the photosensitive drum 1, by which a magenta color toner image is formed on the photosensitive drum 1.

The magenta toner image is transferred onto the transfer material which is carried on the transfer drum 6 only by the electrostatic force, and thereafter, a cyan toner image is transferred from the photosensitive drum 1 in the similar manner, and the cyan toner image is superposedly transferred onto the same transfer material on the transfer drum 6 having been rotated one full turn after magenta toner image transfer. In the similar manner, the yellow toner image and the black toner image formed on the photosensitive drum 1 are transferred onto the same transfer material on the transfer drum 6 with full-turns thereof, and as a result, a four color toner image are superposedly transferred onto the transfer material.

As regards the supply of the transfer material P to the transfer drum, the transfer material P is introduced between the upper guide 100 and the lower guide 22 by the registration rollers 21 and 21' (transfer material feeding rollers) for conveying the transfer material to the transfer drum 6. It is guided by the upper and lower guides and is supplied along the surface of the transfer material carrying sheet 6*a* to an attracting position where the conductive roller 20 (attracting means) and the attraction corona charger (attracting means) 19 are faced to each other.

In this embodiment, the lower guide 22 is pivotable about a pin A and is normally urged in the clockwise direction in FIG. 1A by a coil spring 222 (resilient member). The conductive roller 20 is rotatably mounted at an end of the lower guide 22, so that when the lower guide 22 rotates about the pivot A by an eccentric cam 221 rotated about a pin 220 in a direction indicated by an arrow by an unshown driving means, the conductive roller 20 moves toward and away from the transfer material carrying sheet 6a. The eccentric cam 221 is driven in timed relation with supply of the transfer material P, and when the transfer material P reaches the attracting position, the conductive roller 20 is positioned so as to be in contact with the transfer material carrying sheet 6 as shown in FIG. 1A.

In this embodiment, at the position for supply of the transfer material P to the transfer material carrying sheet 6a, that is, adjacent the attracting position, a deformation correcting means 23 is disposed at an opposite side of the transfer material carrying sheet 6a from the transfer material carrying side. The deformation correcting nip 23 is made for example of dielectric elastic sheet 24 having a thickness of 150 microns and a sheet supporting member 25 for supporting the sheet 24. The correcting means 23 functions to urge and hold the transfer material carrying sheet 6a from the inside so as to correct or prevent mechanical deformation by the brushing roller 15 for the transfer material carrying sheet 6a and/or the deformation by the electrostatic force provided by the corona charger 19.

It is preferable that the elastic force of the deformation correcting means 23 is preferably such that the direction of stretching the transfer material carrying sheet 6a, that is, the direction from the free end of the elastic sheet 24 contacted to the transfer material carrying sheet 6a to the supporting portion by the elastic sheet 24, is opposite from the movement direction of the transfer material carrying sheet, as shown in FIG. 1A. Then, the deformation of the transfer material carrying sheet 6a in the thrust direction (longitudinal direction of the transfer drum) can be reduced. It is possible, as shown in FIG. 1A, that the shield member for the corona charger 19 covers the opening discharging region with an elastic sheet 24 to confine the electric charge distribution in the circumferential direction of the carrying sheet 6a.

In operation, the transfer material P is fed to the transfer material attracting position where the conductive roller 20 is disposed. Thereafter, the corona charger 19 causes the transfer material to be electrostatically attracted on the transfer material carrying sheet 6a and is carried to the transfer position or the transfer charger 7 is faced to the photosensitive drum 1. The transfer material feed by the registration rollers 21 and 21' is timed with the latent image formation by the optical system 3, so that the leading edge of the transfer material is aligned with the leading edge of the latent image at the transfer position.

In this embodiment, the transfer material conveyance guide 223 is disposed between the attracting position or the position where the transfer material is fed to the transfer material carrying sheet and the transfer position. The transfer material conveying guide 223 is integrally formed with the lower guide 22. Then, even when the leading edge portion of the transfer material P suspends in the vertical direction without being attracted to the transfer material carrying sheet 6a at the attracting position due to the change of the ambience condition such as humidity and/or the change in the thickness of the transfer material P, the transfer material P is guided onto the transfer material carrying sheet 6a by the transfer material conveyance guide 223, and is conveyed to the transfer position without jam. The transfer material conveying guide 223 rotates about the pivot A, similarly to the lower guide. When the conductive roller 20 is in contact with the surface of the transfer material carrying sheet 6a, it is away from which is slightly larger than the thickness of the transfer material P. It is positioned to satisfy this.

At the image transfer position, the transfer corona charger 7 operates to produce an image transfer electric field, and by the electric charge applied to the transfer material carrying sheet 6a, the toner image is transferred from the photosensitive drum 1 onto the transfer material P.

Figure 1B:
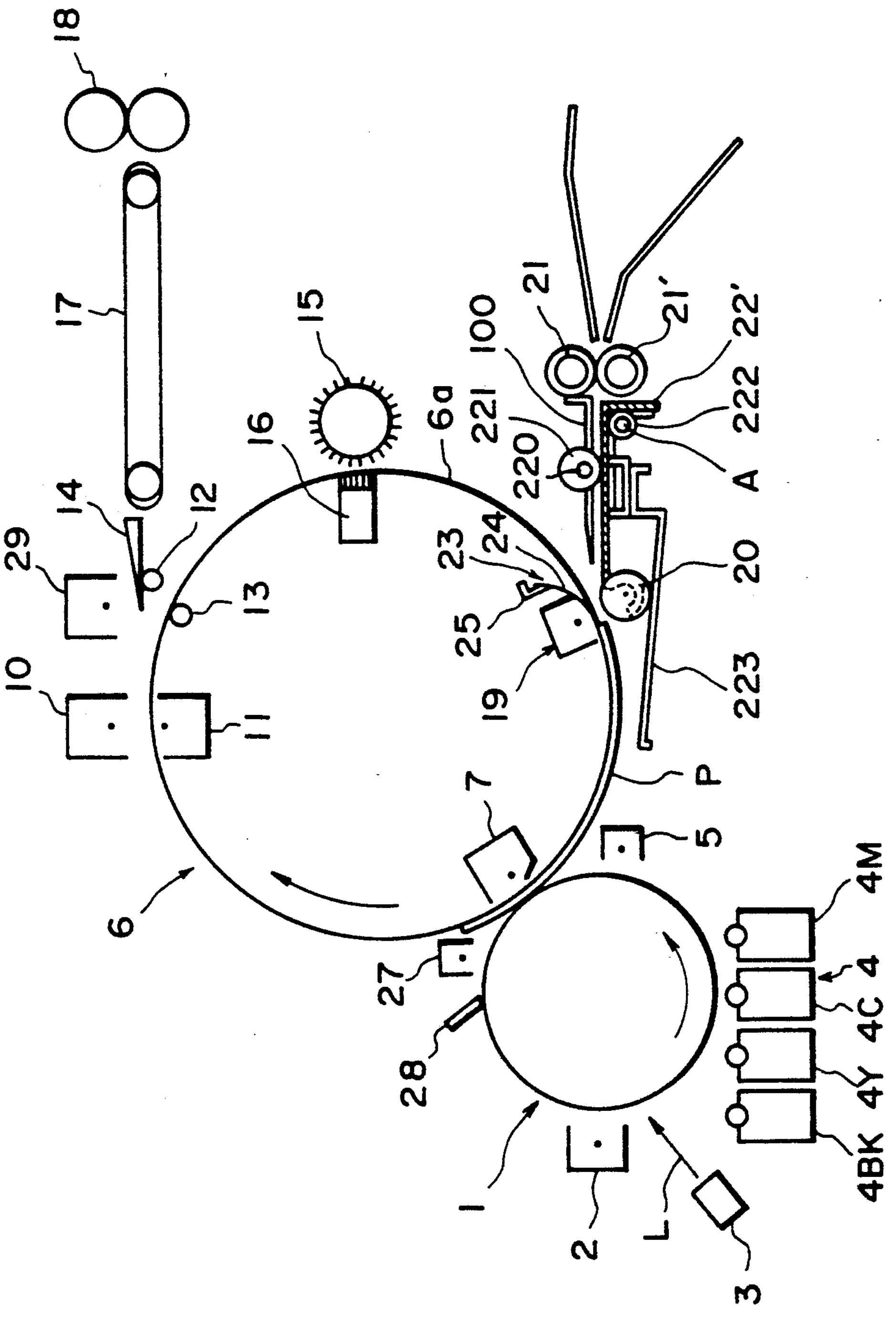
FIG. 1B shows the same state when they are spaced.

As shown in FIG. 1B, in this embodiment, in synchronism with the time when the trailing edge of the transfer material P passes by the conductive roller 20, the driving means rotates the eccentric cam 221 to the bottom bed point. More particularly, the bottom guide 22 is urged by the eccentric cam 221 and is rotated in the counter clockwise direction about a pivot A, and therefore, the distance between the cam shaft 220 and the bottom guide 22 becomes maximum. As a result, the conductive roller 22 and the transfer material conveying guide 223 is significantly retracted from the transfer material carrying sheet 6a.

Figure 3A:
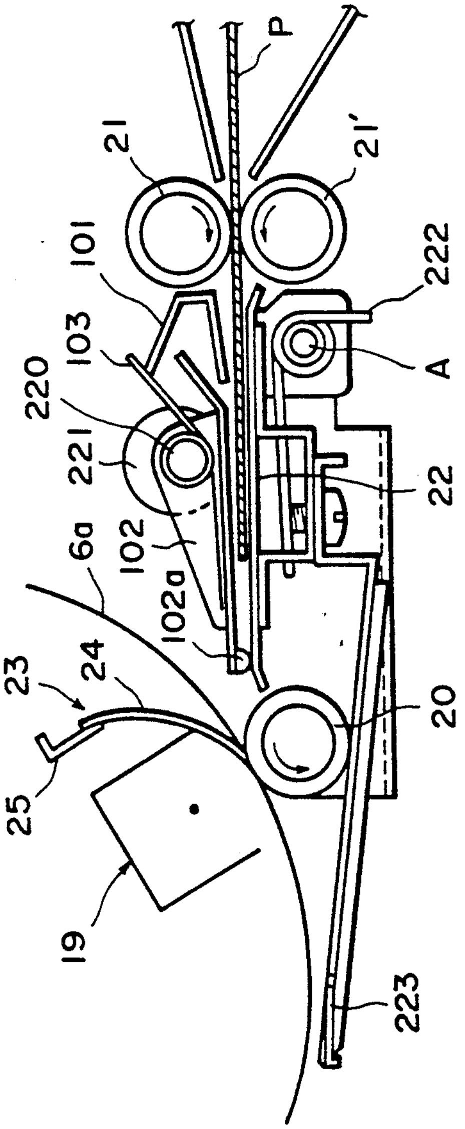
FIG. 3A shows details of a part K of the image forming apparatus shown in FIG. 1.

Referring to FIG. 3A, the upper guide 100 will be described in further detail. FIG. 3A is an enlarged detailed view of a portion K of FIG. 1A. The upper guide system 100 is constituted by a stationary upper guide 101 and a swingable upper guide 102 supported for rotation about a rotational axis 220 of the eccentric cam 221. The swingable upper guide 102 is urged in a counterclockwise direction about a rotational axis 220 by its weight or an urging spring 103, by abutment of a projection 102a at an end of the swingable upper guide 102 to the lower guide, the gap is assured between the upper guide and the lower guide faced to each other. The projection 102a is disposed outside the region where the transfer material P passes adjacent an end of the width of the transfer material P (in the direction perpendicular to the sheet of the drawing), and therefore, the conveyance of the transfer material P is not obstructed by the projection 102a. The urging force of the swingable upper guide by the urging spring 103 is far smaller than the urging force of the urging coil spring 222 for the lower guide 22.

Therefore, the urging force of the urging spring 103 does not rotate in the counterclockwise direction the coil spring 222 urges in the clockwise direction about the pivot A, as shown in FIG. 3A. The gap between the upper and lower guides decreases from the registration roller couple 21 (21') to the conductive roller 20 to introduce the leading edge of the transfer material P to the attraction position. The conveyance speed of the transfer material supported on the transfer drum 6 (the surface speed of the transfer drum) is 84 mm/sec, and the transfer material conveying speed by the couple of registration rollers 21 and 21' is larger than that by 0.185%. Preferably, it is the same or larger by not more than 1%. The distance from the contact position of the registration roller couple to the attracting position, that is, the position of contact between the transfer drum 6 and the conductive roller 20 is 80 mm.

It is difficult to make equal the transfer material conveying speed of the registration roller and the transfer material conveying speed by the transfer drum, because of the dimensional accuracy of the members constituting the transfer drum, the dimensional accuracy of the registration roller or the rotational accuracy or the like of the driving motors therefore. Therefore, it is preferable that the transfer material conveying speed by the registration roller is larger.

Figure 3B:
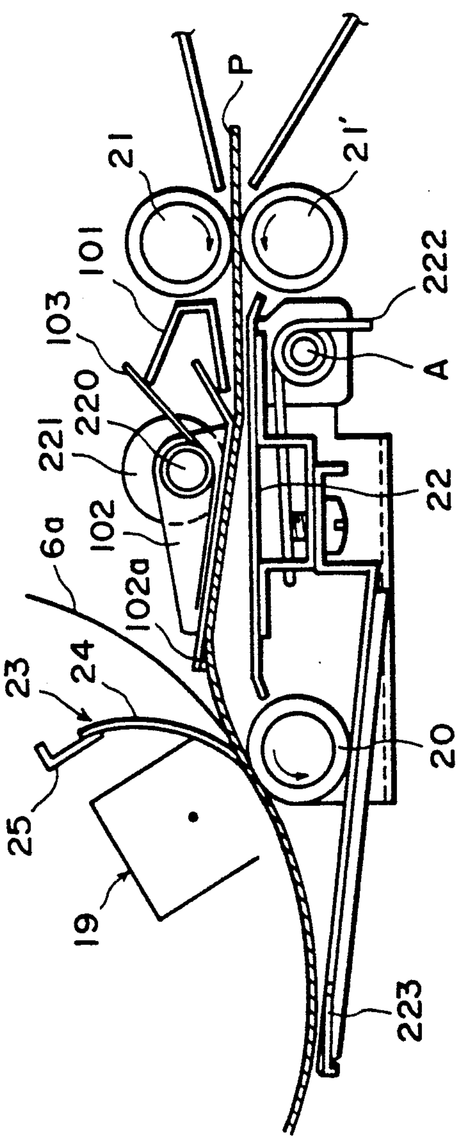
FIG. 3B is a sectional view of a latter part of an image attraction step for attracting the transfer material on the carrying sheet.

FIG. 3B shows the state of attraction of the transfer material to the transfer drum when the conveyance speed of the registration roller is made larger than the transfer material conveying speed by the transfer drum.

By making the transfer material conveying speed by the registration roller larger than the transfer material conveying speed of the transfer drum, as shown in FIG. 3B, when the trailing edge of the transfer material P is in the nip formed between the registration rollers 21 and 21', and the leading side of the transfer material from the nip is in the nip between the conductive roller 20 and the carrying sheet 6A, the transfer material P forms a loop between the conductive roller 20 and the registration roller couple 21 (21'). In order to form the loop, the length of the transfer material measured in the conveyance direction thereof is larger than the distance from the nip of the registration rollers 21 and 21' to the nip between the transfer drum 6 and the conductive roller 20. The loop is formed in the central side of the transfer drum 6, of a line connecting the nip. Therefore, the closecontactness between the carrying sheet 6a and the transfer material P is enhanced. The swingable upper guide 102 disposed between the conductive roller 20 and the registration roller couple 21 (21') swings in the clockwise direction about the shaft 220 with the transfer material retaining force by the carrying sheet 6a and the conductive roller 20 so that the formation of the loop is not obstructed.

More particularly, before the carrying sheet 6a deforms, the swingable upper guide member 102 rotates, and is moved away from the fixed guide (lower guide) 22 which is stationary when the transfer material is conveyed by the registration roller, so that a space for the loop formation is provided while contacting the transfer material. By the loop formation space, the rolling contact of the conductive roller 20 to the transfer material P, and by the back pressure from the attraction corona charger 19 and the deformation correcting means 23 behind the carrying sheet 6a, the transfer material P downstream of the conductive roller 20 with respect to the peripheral movement direction of the transfer drum 6, is completely closely contacted to the carrying sheet 6a and can be conveyed to the transfer position. Therefore, the attracting position deviation of the transfer material relative to the carrying sheet 6a can be prevented, and in addition, the jam can be prevented. Furthermore, the image deviation on the transfer material attributable to the attracting position deviation, the improper contact between the photosensitive drum and the transfer material carried on the carrying sheet 6a attributable to the deformation of the carrying sheet 6a at the transfer position, and the local transfer void resulting therefrom can be prevented.

In this embodiment, the pivot is on a rigid guide, and the swingable upper guide 102 is movable to take an open position relative to the lower guide 22. However, this structure is not limiting.

Figure 4:
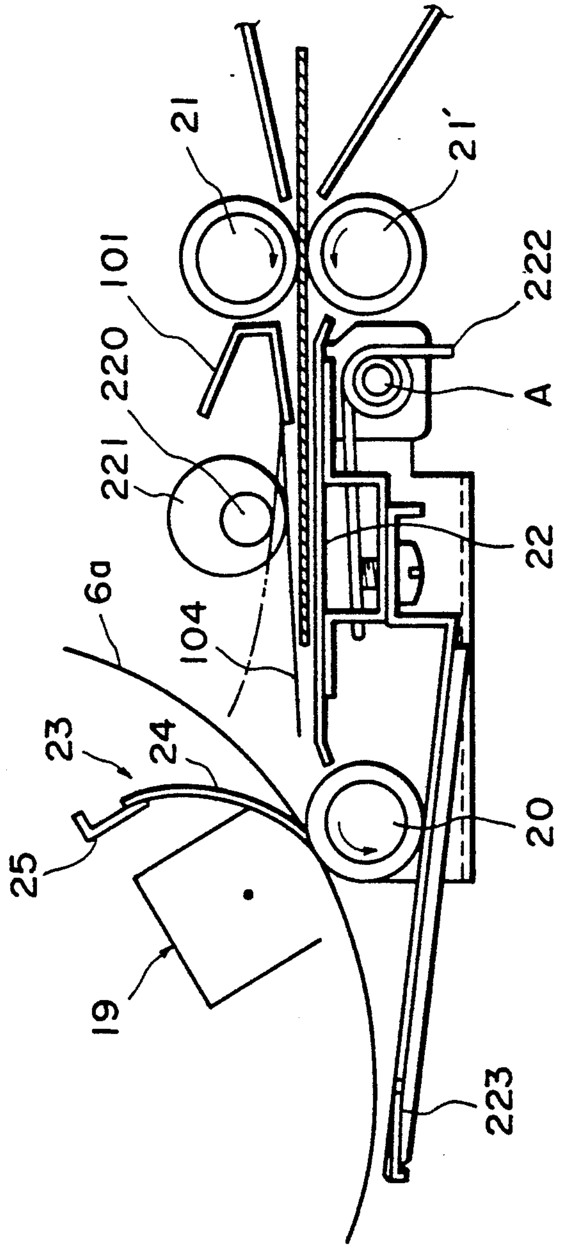
FIGS. 4, 5 and 6 show other embodiments in the cross-section in an image forming apparatus.

FIG. 4 shows another embodiment, wherein an elastic guide 104 is extended toward the attracting position from a side of a stationary guide 101. The elastic guide 104 is preferably made of a thin leaf spring or a conductive film. At the initial stage of the attracting step of the transfer material P, the elastic guide 104 is at the position indicated by a solid line, so that the leading edge of the transfer material is assuredly led to the attracting position. Together with the formation of the loop of the transfer material P, it is displaced to the chain line position with the forced lower than the transfer material retaining force by the carrying sheet 6a and the conductive roller 20, so that a loop formation space is produced.

Figure 5:
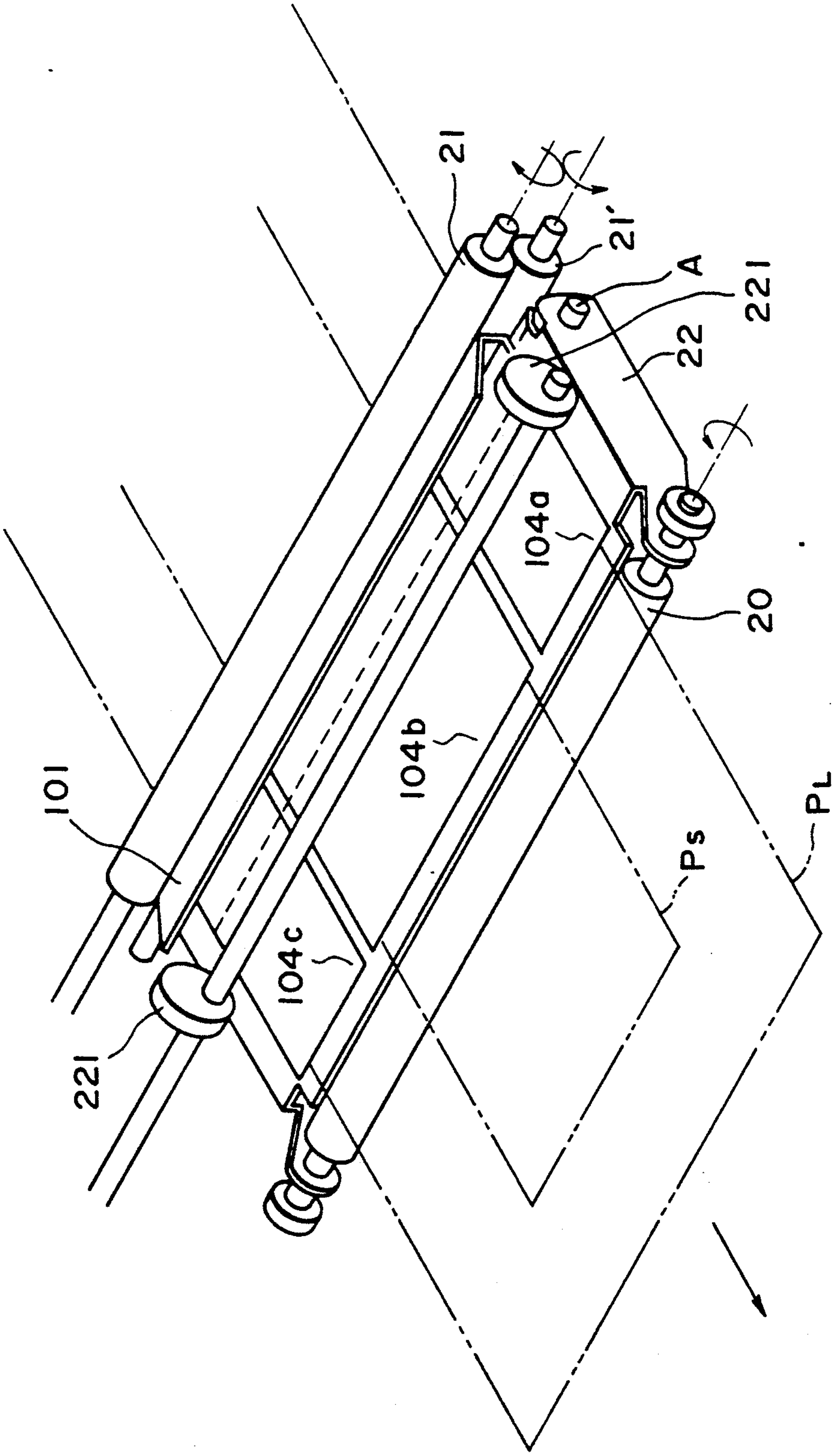

A further embodiment of the present invention will be described conjunction with FIG. 5. FIG. 5 is a perspective view of the upper and lower guides and the conductive roller 20. In this Figure, the upper guide is an elastic guide 104. It is divided into sections 104a, 104b and 104c along a longitudinal direction of the conductive roller 20, that is, in the direction crossing with the movement direction of the transfer material P. The sections are independently swingable. When the transfer materials having two different sizes in the axial direction is guided, the operations will be described, respectively.

When the large size transfer material PL is guided, the transfer material PL acts on all of the elastic guides 104a, 104b and 104c to provide a space for the loop formation.

When a small size transfer material PS is guided, the elastic guide 104 is divided and the divided sections are independently movable, so that only the central elastic guide 104b acts on the transfer material P to provide a space for the loop. Then, even if the size of the transfer materials are different in the longitudinal direction, the force receiving by the transfer material by the elastic guide displacement (urging force of the swingable upper guide) is made substantially uniform along the longitudinal direction of the roller 20 per unit length. Therefore, the conveyance stability of the transfer material can be made substantially uniform irrespective of the size of the transfer material.

In the foregoing embodiment, by the rigidity of the transfer material in the form of the loop, the swingable upper guide 102 or the elastic guide 104 is opened, but this is not limiting.

Figure 6:
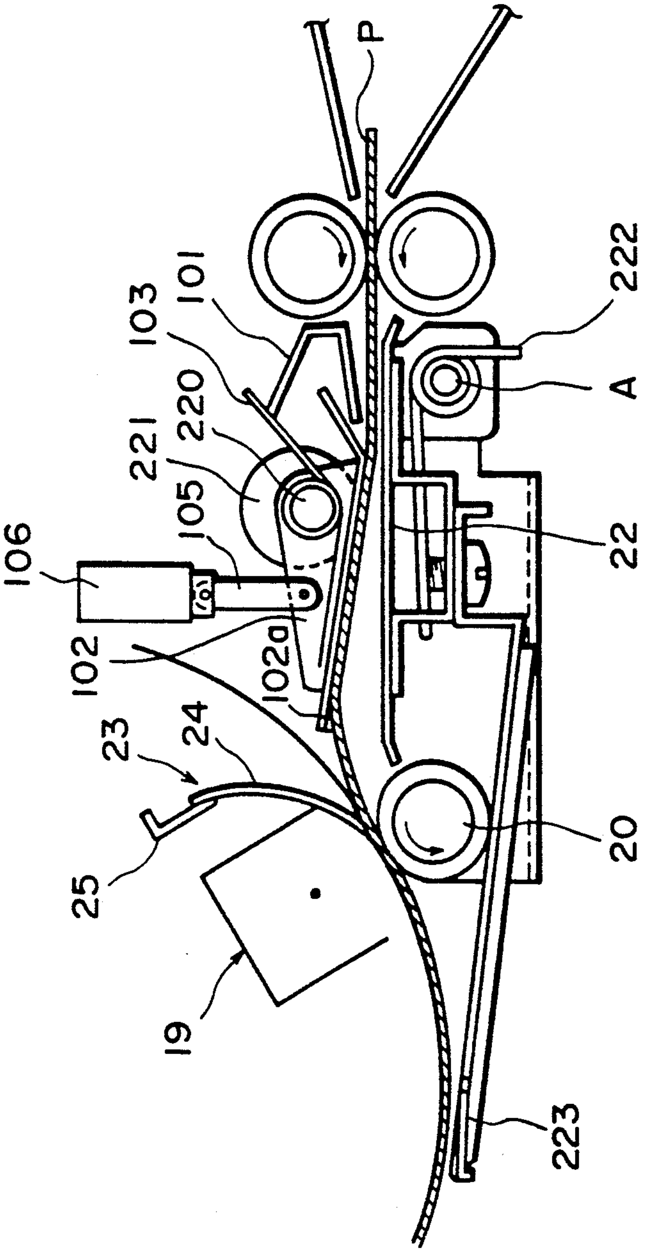

FIG. 6 shows a further embodiment, wherein the swingable upper guide 102 is engaged with a solenoid 106 by a connecting member 105. Against the weight of the guide and the urging force by the urging spring 103, the solenoid 106 rotates clockwisely the swingable upper guide 102 about the rotational shaft 220, by which it is lifted relative to the lower guide 22 to an open position. When the transfer material P is conveyed by the registration rollers 21 and 21', the swingable upper guide 102 is in the attracting position (FIG. 3A), that is, the position where the projection 102a of the upper guide 102 is in contact with the lower guide 22, by which the leading edge of the transfer material assuredly led to the attracting position. When the transfer material is fed through a predetermined distance, the solenoid 106 is energized, by which the swingable upper guide 102 is raised, by which a loop formation space is formed before the loop is formed.

In this embodiment, the transfer material does not receive external force during the attraction step.

As described in the foregoing, in the embodiments of FIGS. 4, 5 and 6, the attracting position deviation and jam of the transfer material, the image deviation and the image improperness can be prevented.

In the foregoing embodiments, the moving speed of the transfer drum and the conveying speed of the registration roller for conveying the transfer material are constant in the attracting process, that is, from the start of the attraction of the transfer material to the end of the attraction of the transfer material. However, it is a possible alternative that the moving peripheral speed of the transfer drum and/or the conveying speed by the registration roller are changed at a certain time during the attraction step. For example, the movement speed of the transfer drum and the registration roller conveying speed are made the same at the initial speed of the attracting step, and at a certain point of time, the moving speed of the transfer drum is decreased, and/or the conveying speed of the registration roller is increased by which the conveying speed by the registration roller is made larger than the peripheral movement speed of the transfer drum. Inversely, at the initial stage of the attraction process, the conveying speed of the registration roller is made larger than the movement speed of the transfer drum, and at a certain point during the attraction period, the movement speed of the transfer drum and the conveying speed of the registration roller may be made the same.

In the foregoing embodiment, the means for carrying the transfer material (recording material) is in the form of a drum, but it may be in the form of a belt.

In the foregoing embodiment, the image formation step on the recording material includes the image transfer step from the image bearing member, but it is possible that an image is directly formed on a recording material. For example, a recording head of an ink jet type, for example, may be faced at the image forming position to a recording material on the recording material carrying means in the form of a belt, and the printing is directly effected thereon.

As described in the foregoing, according to the present invention, the sheet conveying speed of sheet conveying means for conveying the recording material to the recording material carrying means is made the same as or larger than the movement speed of the recording material carrying means, by which the deviation in the attraction position of the recording material to the recording material carrying means and the jam attributable thereto can be prevented, and in addition, the image deviation on the recording material and the improper image production can be prevented, so that a high quality of the image can be maintained.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

recording material carrying means for carrying thereon a recording material, said recording material carrying means being flexible;

image forming means for forming an image on the recording material carried on said recording material carrying means;

attracting means for electrostatically attracting the recording material on said recording material carrying means before image formation on the recording material by said image forming means, said attracting means including contacting means for contacting said recording material carrying means, the recording material passing between said carrying means and said contacting means;

feeding means for feeding the recording material to a contact position where said contacting means is in contact with said recording material carrying means, said feeding means being cooperative with said contacting means to form a loop of the recording material; and guiding means for guiding to said carrying means the recording material fed by said feeding means, said guiding means guiding a leading edge of the recording material in a direction different from a tangential direction of said carrying means, and said guiding means being displaceable to make a recording material moving direction approximate to the tangential direction when the loop is formed.

2. An apparatus according to claim 1, wherein said guiding means includes a first guiding means displaceable in accordance with feeding of the recording material by said feeding means.

3. An apparatus according to claim 2, wherein said guiding means includes a second guiding means faced to said first guiding means, said second guiding means is stationary when the recording material is conveyed by said feeding means.

4. An apparatus according to claim 3, wherein when the recording material is fed by said feeding means, a downstream end of said said first guiding means with respect to a direction of the feeding is displaced away from said second guiding means.

5. An apparatus according to claim 2, wherein said first guiding means has an elasticity.

6. An apparatus according to claim 2, further comprising driving means for moving said first guiding means.

7. An apparatus according to claim 2, wherein said first guiding means is separable along a direction crossing with a feeding direction of the recording material, and divided parts are independently displaceable.

8. An apparatus according to claim 4, wherein said first guiding means is disposed between said recording material carrying means and said second guiding means.

9. An apparatus according to claim 1, wherein said recording material carrying means attracts the recording material thereon mainly by electrostatic force.

10. An apparatus according to claim 1, wherein said recording material carrying means includes a dielectric material sheet to carry the recording material.

11. An apparatus according to claim 1, wherein said image forming means includes an image bearing member for carrying a toner image and transfer means for transferring the toner image from said image bearing member to the recording material carried by said recording material carrying means.

12. An apparatus according to claim 1, wherein said recording material carrying means is movable along and endless path, and wherein a plurality of different color images are formed on the same recording material carried on said recording material carrying means.

13. An apparatus according to claim 1, wherein said apparatus is capable of forming a full color image on the recording material.

14. An apparatus according to claim 1, wherein said contacting means includes a rotatable member contactable to a recording material carrying surface of said recording material carrying means.

15. An apparatus according to claim 14, wherein said attracting means includes corona charging means disposed faced to an opposite side of said recording material carrying means from said rotatable member.

16. An apparatus according to claim 1, further comprising an urging means, disposed across said carrying means from said contacting means, for urging said carrying means.

17. An apparatus according to claim 16, wherein said urging means comprises an elastic sheet.

18. An apparatus according to claim 1, wherein said feeding means feeds the recording material at a speed which is higher than a movement speed of said carrying means.

19. An apparatus according to claim 2, wherein said first guiding means is displaceable by a feeding force of said feeding means.

20. An apparatus according to claim 1, further comprising a second guiding means, disposed downstream of the contact position and upstream of an image forming position with respect to a movement direction of said carrying means, for guiding the recording material carried on said carrying means.

21. An apparatus according to claim 3, wherein said contacting means and said second guiding means are simultaneously movable to a position where said contacting means and said second guiding means they are out of contact with the recording material when the recording material having the image is in the contacting position.

* * * * *

UNITED STATES PATENT AND TRADEMARK OFFICE
CERTIFICATE OF CORRECTION

PATENT NO. : 5,168,290
DATED : December 1, 1992
INVENTOR(S) : TANAKA et al.

It is certified that error appears in the above-identified patent and that said Letters Patent is hereby corrected as shown below:

COLUMN 2
Line 4, "(rebound)" should read --(rebounds)--.

COLUMN 4
Line 56, "are" should read --is--.

COLUMN 7
Line 30, "closecontactness" should read --close contact--.

COLUMN 8
Line 24, "is" should read --are--.

COLUMN 10
Line 25, "is" should read --being--.

COLUMN 12
Line 13, "they" should be deleted.

Signed and Sealed this

Twenty-first Day of December, 1993

Attest:

Bruce Lehman

BRUCE LEHMAN

*Attesting Officer* *Commissioner of Patents and Trademarks*